United States Patent
Tate et al.

(10) Patent No.: US 7,983,476 B2
(45) Date of Patent: Jul. 19, 2011

(54) WORKING APPARATUS AND CALIBRATION METHOD THEREOF

(75) Inventors: Shunta Tate, Tokyo (JP); Masato Aoba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 256 days.

(21) Appl. No.: 12/357,808

(22) Filed: Jan. 22, 2009

(65) Prior Publication Data

US 2009/0190826 A1 Jul. 30, 2009

(30) Foreign Application Priority Data

Jan. 24, 2008 (JP) ................... 2008-014177

(51) Int. Cl.
*G06K 9/00* (2006.01)

(52) U.S. Cl. ....................... 382/154; 382/287

(58) Field of Classification Search .......... 382/103, 382/154, 286, 287; 348/94, 95, 135; 356/243.1
See application file for complete search history.

(56) References Cited

U.S. PATENT DOCUMENTS

2004/0170315 A1* 9/2004 Kosaka et al. ............. 382/154

FOREIGN PATENT DOCUMENTS

| JP | 64-002889 A | 1/1989 |
|---|---|---|
| JP | 04-313106 A | 11/1992 |
| JP | 2616225 B2 | 6/1997 |
| JP | 11-189393 A | 7/1999 |
| JP | 2003-028614 A | 1/2003 |
| JP | 3402021 B2 | 4/2003 |

\* cited by examiner

*Primary Examiner* — Andrew W Johns

(74) *Attorney, Agent, or Firm* — Cowan, Liebowitz & Latman, P.C.

(57) ABSTRACT

A working apparatus comprises a working unit which executes work on a work subject, and a calibration jig on which a plurality of markers is arranged in a radial pattern from a center point of markers, the plurality of markers being arranged in three dimensions, and the calibration jig being attached to a working unit such that a calibration reference point set of a working unit coincides with a center point of markers. According to such a composition, it becomes possible to calibrate a position of a working unit even when a portion of the jig containing a center point of markers is occluded during image measurement.

11 Claims, 11 Drawing Sheets

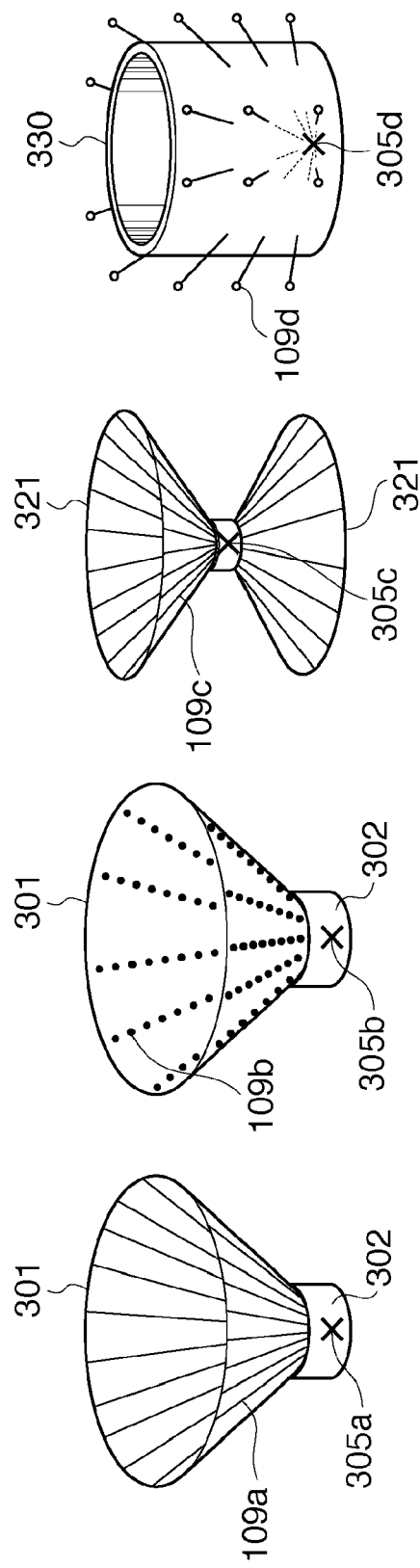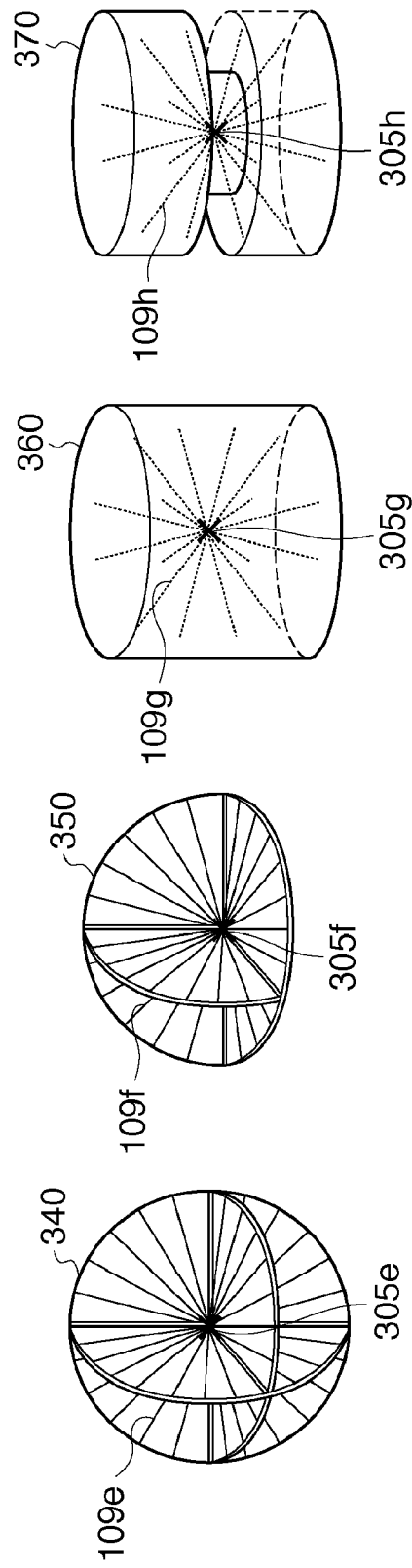

WORKING APPARATUS AND CALIBRATION METHOD THEREOF

BACKGROUND OF THE INVENTION

1. Field of the Invention

The present invention relates to a working apparatus and calibration method thereof. In particular, the present invention relates to calibration of coordinates a working apparatus which controls a working unit having a machine using an image captured by an imaging means.

2. Description of the Related Art

Regarding assembly work and inspection using robotic arms, there is a practice in which a fixed camera detects the position and orientation of a work subject, and a robotic arm approaches and performs predetermined work. For this, a camera parameter which is a transform function between world coordinates and image coordinates, and forward and inverse kinematics that are transform mapping between robot sensor information and world coordinates must be known in advance. Because there is image strain originating from image capture in an image, and also because there is a small deviance due to mechanical error and aging, it is desirable to correct deviances over a wide range in which the robot does work with high precision. Such correction work is called calibration.

In actual calibration work, the end tip of the robot arm is designated as the work reference point, the robot arm is moved to a plurality of points, and the position of each work reference point in world coordinates is calculated from robot sensor information. Further, the positions of the work reference points in world coordinates are determined from an image taken by a fixed camera, and correction of position deviation is executed by transforming these into world coordinates.

In the calibration work mentioned above, the work reference points may not be able to be directly confirmed in the image based on the orientation of the robot arm and position of the fixed camera. For this reason, a method of attaching a flat calibration jig plate fixed with high contrast markers to the end tip of the robot arm and executing calibration is disclosed in, for example, Japanese Patent Laid-Open S64-2889 (hereafter, cited reference 1), Japanese Patent Laid-Open 3402021 (hereafter, cited reference 2), etc. Several publicly known configurations of markers such as lattice, rectangle, polygon, or circular arrangements are used.

The flat calibration jig plate mentioned above has several problems such as those mentioned below. That is, (1) The publicly disclosed calibration methods do not make the assumption that a large portion of the indicator surface of the calibration jig is blocked. However, in the case of a robot arm with multiple degrees of freedom, it is possible that a large part of the calibration jig plate is blocked by the robot arm, depending on its position and orientation. Calibration cannot be executed in such a case using the calibration jig plate of the above example, and in order to avoid this the angle of the calibration jig plate must continually be changed, the fixed camera must be set in a location where blocking does not occur, or the calibration jig plate must be enlarged. However, because a large calibration jig plate can easily interfere with a robot arm or the floor, limiting the freedom of movement of operation of the robot arm, it is not suitable as a calibration jig.

(2) When the observational angle of the calibration jig plate becomes acute due to the position and orientation of the robot arm, the estimated precision can decrease significantly because the markers become difficult to observe.

(3) Conventionally, the positions and orientations of the markers are detected, and the work reference points of the robot arm are derived as relative positions to the markers. Because there is a predetermined distance between the markers and the work reference points of the robot arm, if there is an error in the estimation of the positions and orientations of the markers, an error in the calculation of operation reference points can become amplified.

(4) While the work precision can be raised by using multiple cameras, an increase in the number of cameras makes avoiding problems (1) and (2) mentioned above more difficult.

As a means of solving a part of the disadvantages of the flat plate markers, markers with a three-dimensional shape can be cited. A method of gluing concentric circular markers with height differences to a work subject and measuring them with a camera, and deriving the relative position and orientation of the work subject is disclosed in Japanese Patent Laid-Open 2616225 (hereafter, cited reference 3) and Japanese Patent Laid Open H4-313106. However, as there is a necessity for the camera to be positioned somewhat directly in front of the markers using this method, this method is not suited to a case in which a jig is simultaneously measured using a plurality of cameras from a wide range of angles.

Further, Japanese Patent Laid-Open H11-189393 (hereafter cited reference 5) and Japanese Patent Laid-Open 2003-28614 (hereafter cited reference 6) mention methods using markers in a radial pattern. These methods use the fact that the pattern in the central part of the markers in a radial pattern are unchanging with respect to expansion and reduction, detect the center of the markers in a radial pattern using a template matching method, and detect the position of the work subject. However, cited references 5 and 6 above do not assume the case in which the central part of the markers is hidden and cannot be captured, and the problem (1) mentioned above can occur.

SUMMARY OF THE INVENTION

The present invention was made in consideration of the above problems, and its exemplary embodiments provide an apparatus and method which allow execution of position calibration of a working unit even when a part of calibrating jig including a center of its markers is occluded during image measurement.

According to one aspect of the present invention, there is provided a working apparatus comprising: a working unit which executes work on a work subject; and a calibration jig on which are arranged a plurality of markers in a radial pattern from a center point of markers, wherein the plurality of markers are arranged in three dimensions, and wherein the calibration jig is attached to the working unit such that a reference point for calibration set on the working unit matches a center point of the markers.

Also, according to another aspect of the present invention, there is provided a calibration method of a working apparatus equipped with a working unit which executes work on a work subject, and a calibration jig on which is arranged a plurality of markers in a radial pattern from a center point of markers, the plurality of marker being distributed in three dimensions, the calibration jig being attached to the working unit such that a set calibration reference point of the working unit matches with the center point of markers, and the method comprising: an image capture step of capturing the working unit; a calculation step of calculating image coordinates of a center point of markers based on a marker image existing in an image captured by the image capture step; and a calibration step of calibrating a transform process to transform image coordinates and apparatus coordinates based on coordinates of a center point of markers calculated by the calculation step and apparatus coordinates of the reference point of the working unit.

Furthermore, according to another aspect of the present invention, there is provided a working apparatus, comprising: a working unit which executes work on a work subject; and a calibration jig on which is arranged a plurality of markers in a radial pattern from a center point of markers, wherein the plurality of markers are arranged in three dimensions, and wherein the calibration jig is fixed externally to the work subject such that a reference point of the work subject matches the center point of markers.

Furthermore, according to another aspect of the present invention, there is provided a working apparatus, comprising: a working unit which executes work on a work subject, and a calibration jig on which is arranged a plurality of markers in a radial pattern from a center point of markers, wherein the plurality of markers are arranged in three dimensions, wherein a position in which the center point of markers exists is a space in which a calibration jig does not exist, and wherein the calibration jig is externally fixed to the work subject such that, when the work subject is moved to a predetermined position, a position of a marker arranged on the work subject and a position of the center point of markers match.

Further features of the present invention will become apparent from the following description of exemplary embodiments with reference to the attached drawings.

BRIEF DESCRIPTION OF THE DRAWINGS

FIGS. 3A-3H are diagrams illustrating various usable shapes for a calibration jig according to the first embodiment.

DESCRIPTION OF THE EMBODIMENTS

Exemplary embodiments of the present invention will now be described in detail in accordance with the accompanying drawings.

First Embodiment

In the first embodiment, a method of calibrating a position in three-dimensional space to increase the precision of work before a robot arm which is a working unit operates on a work which is a work subject will be given. In the present embodiment, image coordinates which are coordinates directly on an image and robot coordinates which are coordinates on an apparatus are calibrated without deriving camera parameters in advance.

Figure 1:
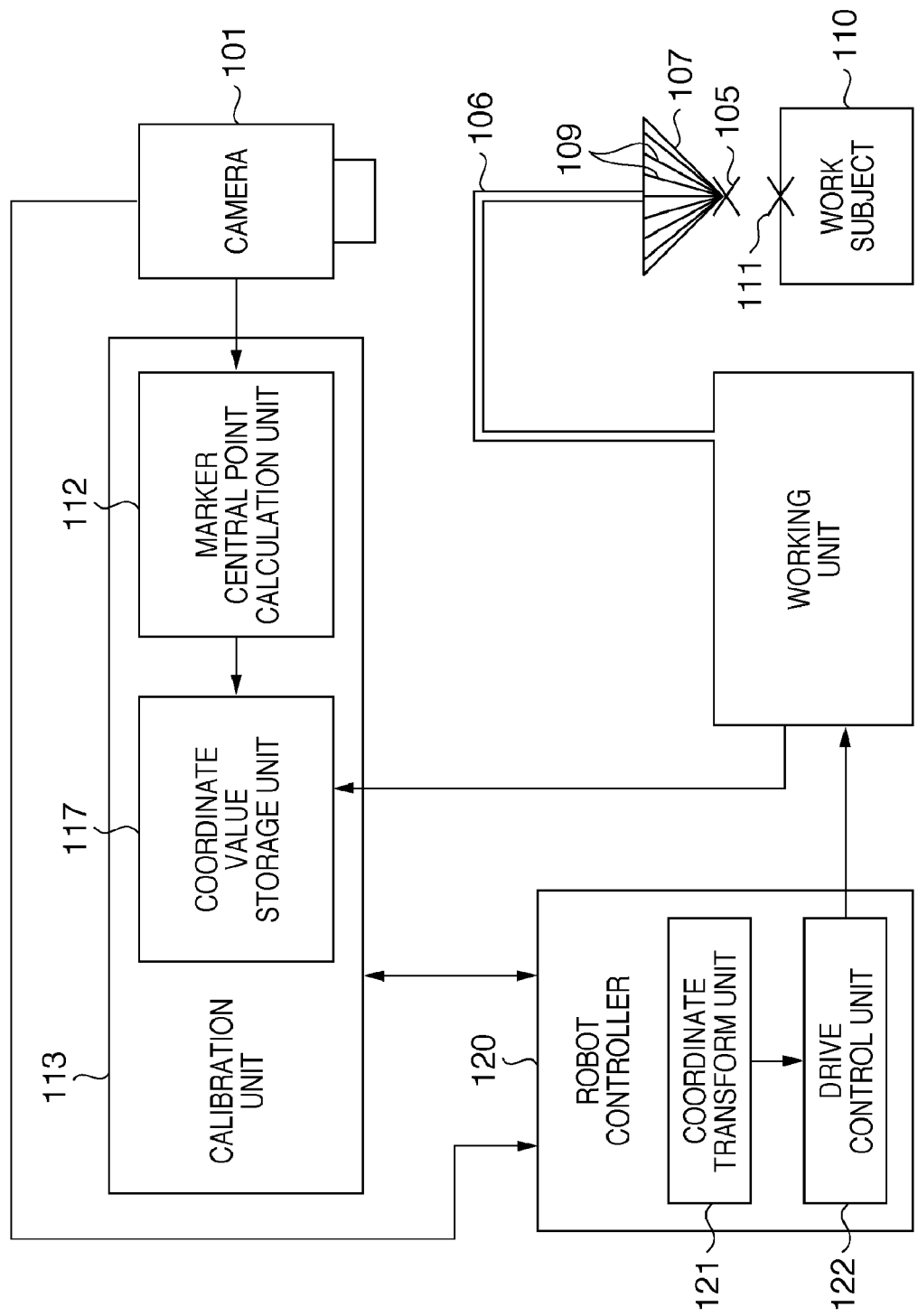
FIG. 1 is a block diagram illustrating a frame format of a machine control apparatus and a robot as a controlled machine according to the first embodiment.

FIG. 1 is a block diagram illustrating a machine control apparatus and a robot as a controlled machine according to the first embodiment. Further, FIG. 2 is a perspective view illustrating a robot according to the first embodiment.

A robot controller 120 comprises a coordinate transform unit 121 and a drive control unit 122. A coordinate transform unit 121 transforms coordinates on an image captured by a camera 101 into robot coordinates which are coordinates on an apparatus. A drive control unit 122 controls the entire robot including a working unit 106. In particular, the drive control unit 122 drives a robot which is to move (a reference point of) a working unit 106 to a position indicated by coordinates acquired from a coordinate transform unit 121.

A calibration unit 113 calibrates a coordinate transform process performed by the coordinate transform unit 121, which transforms a coordinate value on an image captured by a camera 101 to a coordinate value in robot coordinates. This calibration process will be explained later. A marker central point calculation unit 112 calculates a coordinate value (image coordinates) of a marker central point calculated based on markers 109 detected from an image captured by a camera 101. A coordinate value storage unit 117 associates a coordinate value calculated by a marker central point calculation unit 112 and a coordinate value (robot coordinates) of a work reference point 105 of a working unit 106 and stores them. A calibration unit 113 calibrates transform processing of image coordinates and robot coordinate space based on coordinate values stored in a coordinate value storage unit 117.

Figure 2:
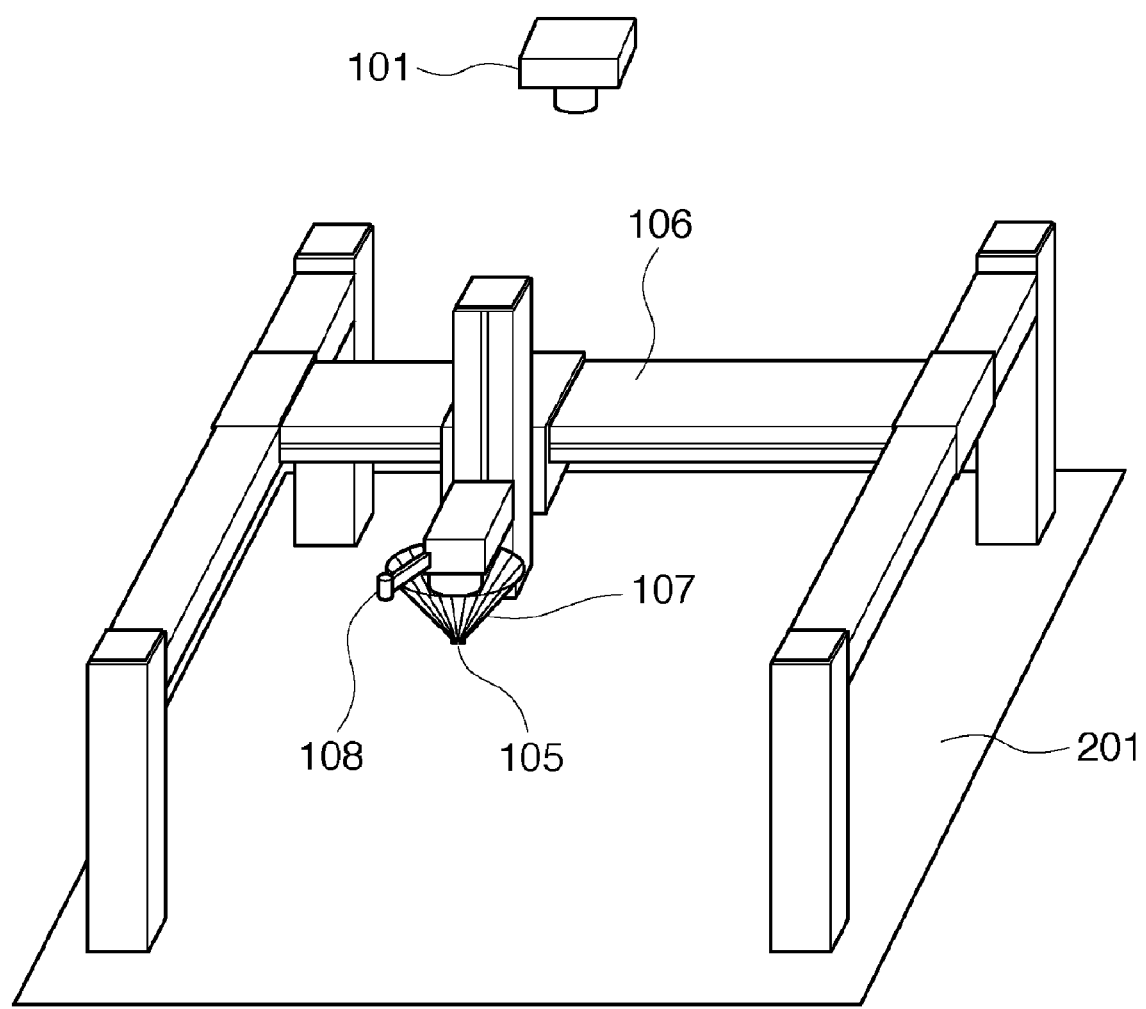
FIG. 2 is a perspective view illustrating a frame format of a robot according to the second embodiment.

As shown in FIG. 2, a working unit 106 touches an XYZ orthogonal robot arm. Further, a circular conic calibration jig 107 is fixed to the working unit 106, and linear markers 109 are arranged in a radial pattern on the circular conical surface of the circular conic part of the calibration jig 107. A work subject reference point 111 is set on a work subject 110 which is a work of an assembly part, etc. Further, an XYZ orthogonal robot arm is installed on a stage 201. Above the stage 201 is placed a camera 101 as an example of imaging means. Further, a laser distance meter 108 is fixed to the robot arm. The laser distance meter 108 can measure the height from the robot arm (working unit 106 or work reference point 105) to the stage 201 or from the robot arm to a work subject 110 on the stage 201 (work subject reference point 111).

(Form of the Calibration Jig)

Examples of calibration jigs 107 that can be used in the present embodiment are shown in FIGS. 3A-3H. The jig 107 shown in FIG. 3A comprises a circular conical part 301 of a cone and a circular cylindrical part 302, and linear markers 109a are marked in a radial pattern on the circular conical part 301. Moreover, only one marker if marked with a reference numeral for illustrative convenience. A clip-shaped mechanism (not shown) for attachment to a hand is equipped in the interior of the circular cylindrical part 302. The clip-shaped mechanism mentioned above may also have a knob or screw attachment hole as a hand. The calibration jig 107 is fixed to the robot arm such that a marker central point 305a that is the central point of the radially arranged markers 109a is correctly aligned with a work reference point 105 of a robot arm.

As examples of calibration jigs 107 other than FIG. 3A, forms shown in FIGS. 3B-3H can also be used. The calibration jig 107 shown in FIG. 3D comprises a pattern distributed such that pin-shaped markers 109d are located on a cylindrical body 330 in a radial pattern with a maker central point 305d as the center. Further, the calibration jig 107 shown in FIG. 3G is a transparent block 360 which allows light to pass made of plastic, etc., and the linear markers 109g are engraved in the transparent block by laser engraver, etc. Markers 109g are distributed in a radial pattern with a marker central point 305g as the center. The calibration jig 107 shown in FIG. 3H comprises a block 370 of a form obtained by performing cutting, drilling, etc., processes on the block 360 of the calibration jig 107 shown in FIG. 3G, allowing grabbing or fixture to a specific robot arm. Regarding FIG. 3H, markers 109h are arranged in a radial pattern with a marker central point 305h as the center.

As shown in FIG. 3E and FIG. 3F, forms in which a plurality of disc members 340 marked with radial markers 109e or semi-circular members 350 marked with markers 109f are assembled in three-dimensions may also be used. Regarding FIGS. 3E and 3F, markers 109e and 109f are distributed in a radial pattern with marker central point 305e and marker central point 305f as the centers, respectively. Moreover, the calibration jig 107 may have a composition with point-symmetry in all directions from a central origin point as shown in FIG. 3E, or may have a composition without directional point-symmetry such as a circular cone in FIG. 3A or a pyramid. As in FIG. 3C, a form in which 2 circular cone parts 321 are assembled as a pair, or 3 circular cones are assembled such that they are distributed to be facing an x-axis, y-axis and z-axis, or radially shaped forms are partially assembled may also be used. Regarding FIG. 3C, markers 109c are distributed in a radial pattern with a marker central point 305c as the center. As shown in FIG. 3B, circular markers 109b may also be distributed in a radial pattern with a marker central point 305b as the center as distributed markers in a circular cone 301.

(Calibration Work)

Figure 4:
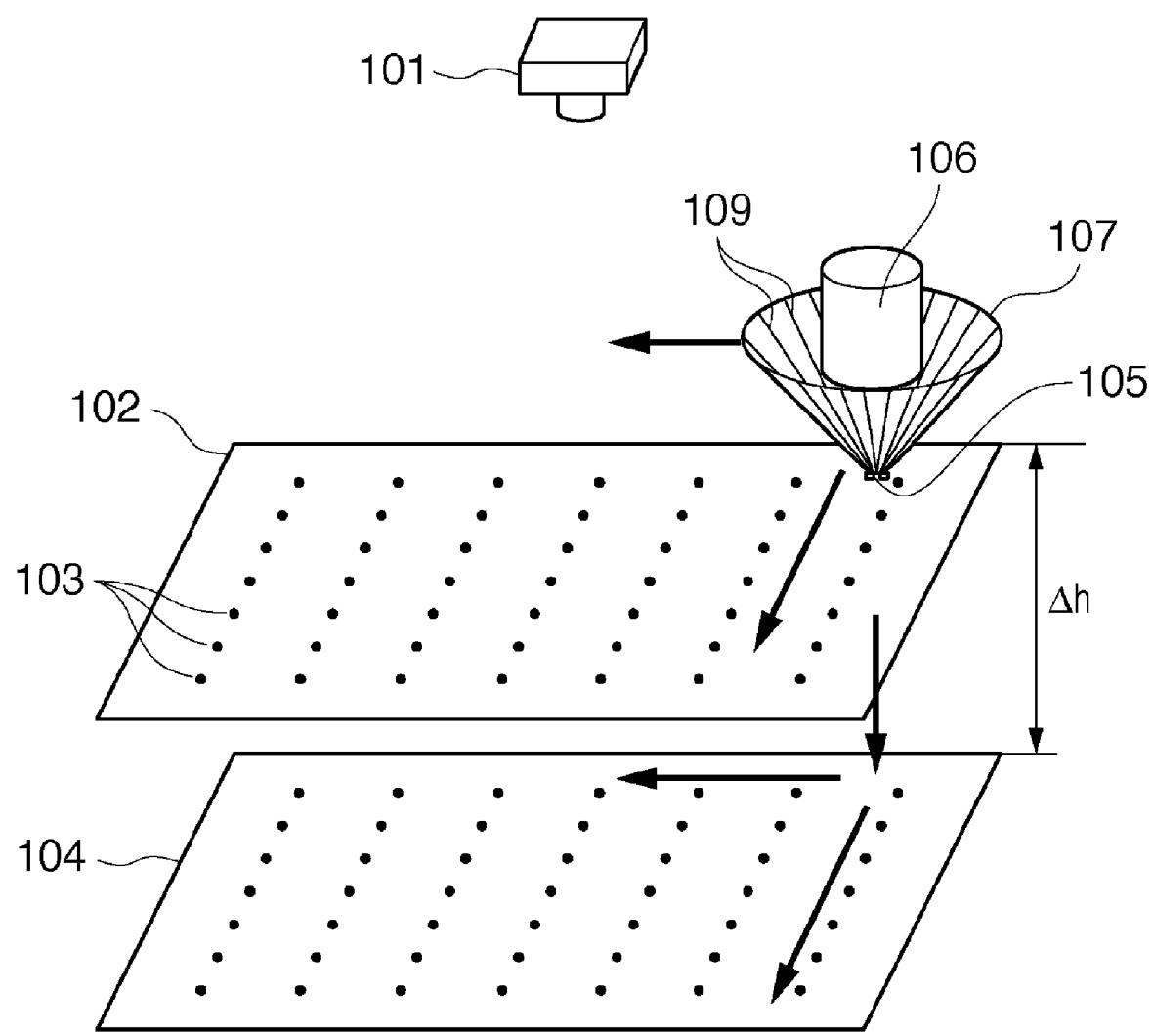
FIG. 4 is a diagram explaining a calibration method concerning the first embodiment.

Next, a process of calibration work done by a calibration unit 113 will be explained. As shown in FIG. 4, a working unit 106 (robot arm) fixed to a calibration jig 107 is moved to a point 103 in robot coordinates where calibration is performed. Here, the robot coordinate values of the ith calibration point will be designated $p_i(x_i, y_i, z_i)$. Further, at this time, the height to a floor of a stage is measured by a laser distance meter 108 and stored. Because the height of the laser distance meter 108 and the height of a work reference point 105 do not match, this difference is measured in advance, and the value is set as a calibration reference point height $h_i$. Next, a robot arm is measured by a camera 101 located above. Markers 109 distributed on a calibration jig 107 are extracted from an image captured by the camera 101, and parameters in image coordinates of line segments are obtained by executing image processing such as Hough transform. Further, at this time, when using a calibration jig 107 with circular markers 109b with high contrast lined up in a radial pattern such as that shown in FIG. 3B, a blob of predetermined size can be extracted by preprocessing, and Hough transform may be executed on the extracted blobs.

Figure 5:
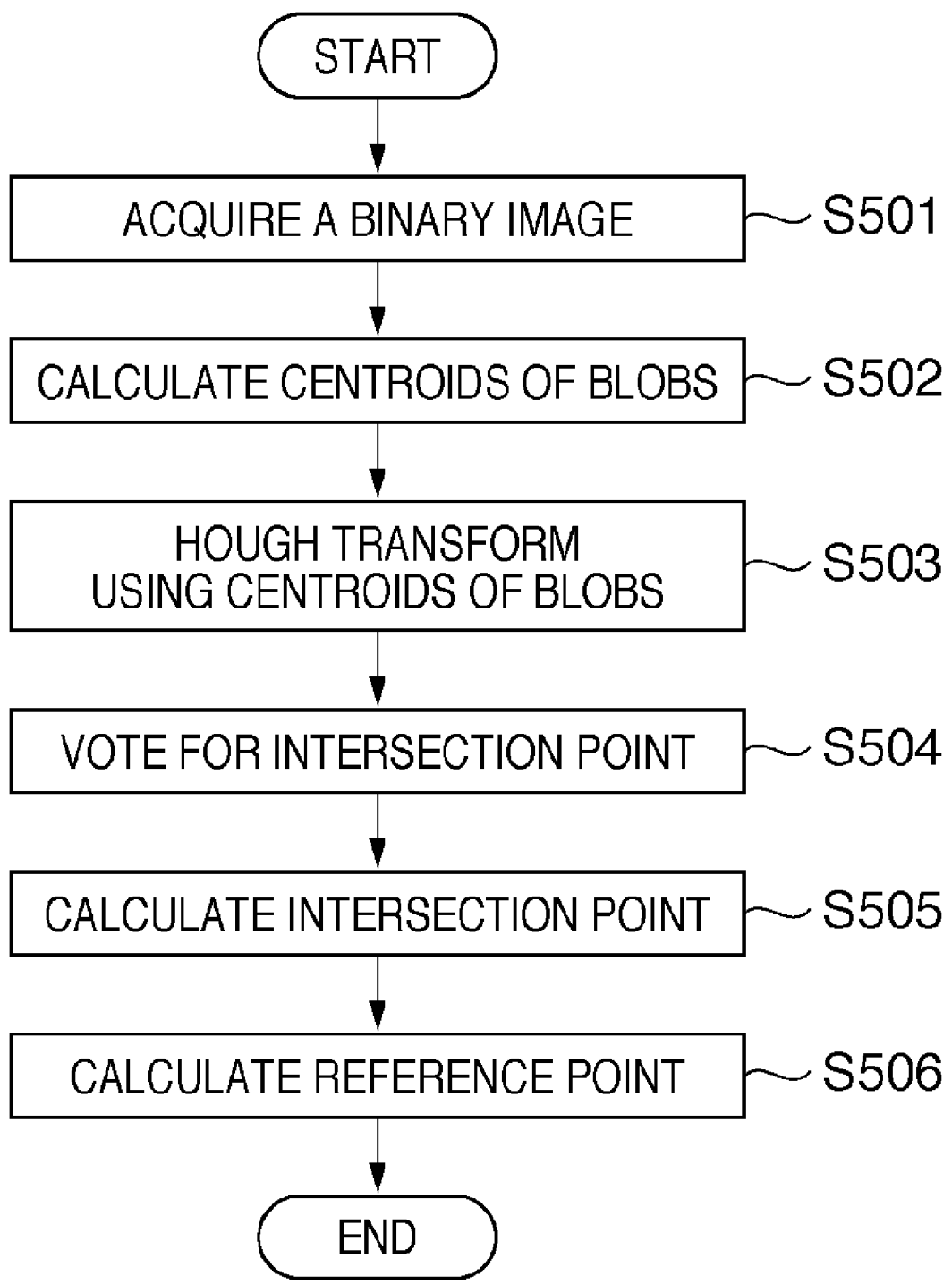
FIG. 5 is a flowchart explaining processing to image-measure reference points using a calibration jig comprising circular markers of FIG. 3.

The image process mentioned above is executed on at least two line segments, and by obtaining the intersection of those line segments the position $q_i(u_i, v_i)$ of a calibration reference point of the ith calibration point on the image is acquired. As an example, processing in the case of obtaining a calibration reference point using circular markers 109b is shown in the flowchart of FIG. 5. In step S501 a marker central point calculation unit 112 of a calibration unit 113 binarizes an input image from a camera 101 and acquires a binary image. In step S502 a marker central point calculation unit 112 extracts blobs from the binary image and obtains the centroid of blob. Next, in step S503, the marker central point calculation unit 112 executes Hough transform using the centroid of the plurality of blobs. In step S504, the marker central point calculation unit 112 executes voting on the intersections of line segments using a plurality of lines segments acquired as a result of Hough transform. In step S505, the marker central point calculation unit 112 acquires the intersection point that had the highest vote value as a result of voting in step S504. Then, in step S506, the marker central point calculation unit 112 determines coordinates (image coordinates) corresponding to the intersection point as a calibration reference point.

Moreover, in consideration of detection error of the line segments, a plurality of line segments can be detected, and a vanishing point can be obtained using the least squares method, etc. A vanishing point can also be obtained using an LTS estimation which is a robust estimation method or an LMedS estimation. When obtaining a vanishing point using the least squares method, although the precision of estimation of a vanishing point can deteriorate if unrelated line segments not belonging to markers 109 distributed in a radial pattern become mixed in as outliers, an estimation with little influence from outliers is possible if the robust estimation method mentioned above is used.

In the calibration unit 113, a height value $h_i$ acquired by a laser distance meter 108 is added to a position $q_i(u_i, v_i)$ of a calibration reference point in image coordinates obtained this way, and is set as an expanded coordinate value $r_i(u_i, v_i, h_i)$. Then, $r_i$ and the coordinate value combination of a point $p_i(x_i, y_i, z)$ in robot coordinates corresponding to $r_i$ are stored in a coordinate value storage unit 117.

Figure 6:
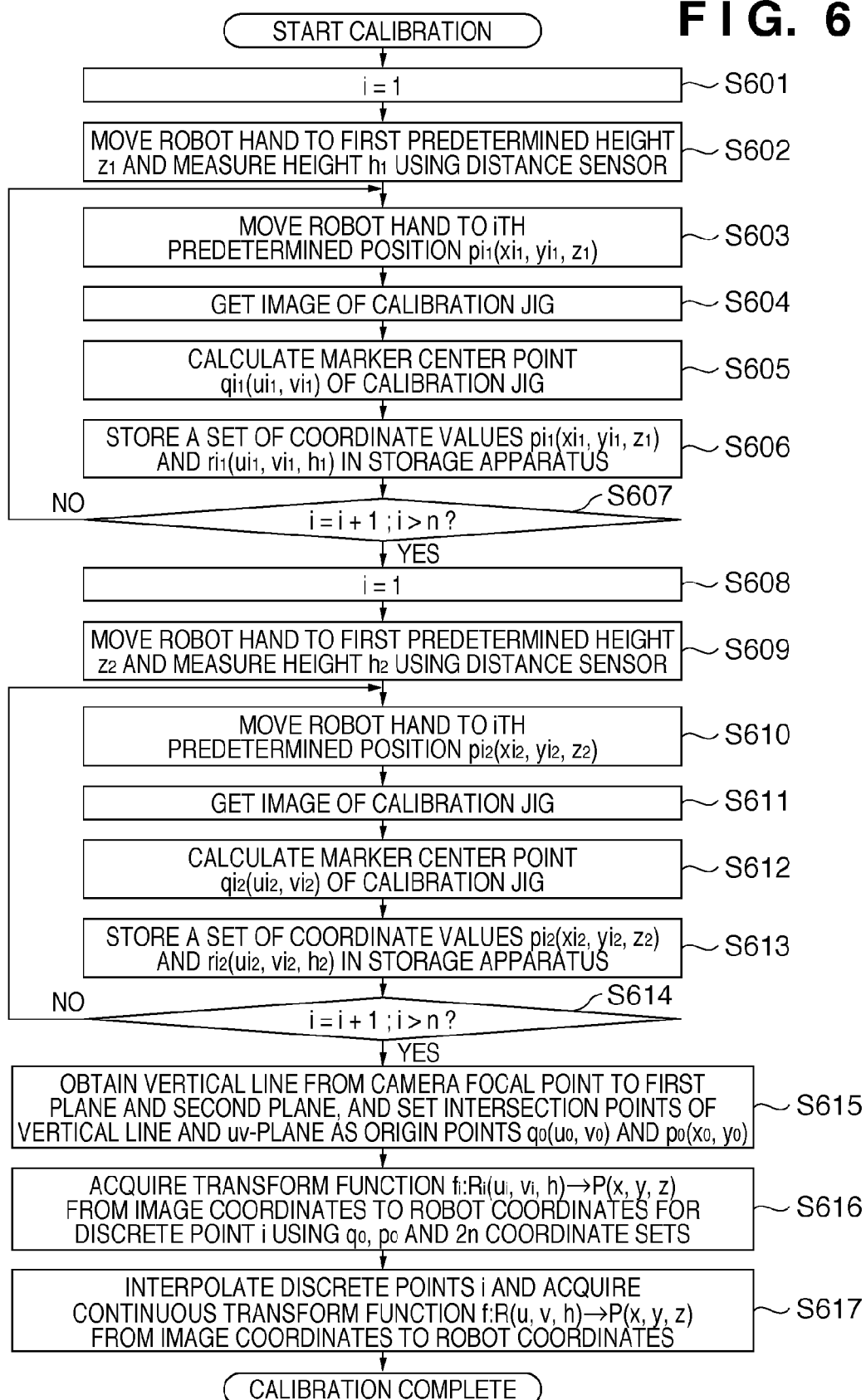
FIG. 6 is a flowchart illustrating calibration processing according to the first embodiment.

In calibration work of the present embodiment, calibration is executed using the two types of calibration point heights $z_1$ and $z_2$. FIG. 6 is a flowchart explaining calibration processing according to the present embodiment.

In step S601, a calibration unit 113 sets a counter i which counts the number of calibration points to 1. In step S602, a robot controller 120 drives a robot hand, moves a work reference point 105 of a working unit 106 to a first height $z_1$, and measures a height $h_1$ with a laser distance meter 108. Then, in step S603, the robot controller 120 drives a robot hand and moves the work reference point 105 of the working unit 106 to $p_{i1}(x_{i1}, y_{i1}, z_1)$. In steps S604 and S605, a marker central point calculation unit 112 measures a position $q_i(u_i, v_i)$ of a calibration reference point of a calibration jig 107 using an image captured by a camera 101 by, for example, processing explained in FIG. 5. At this time, a coordinate value of a center point of markers in the vertical direction with respect to the image calculated from the image is acquired from a value measured by a sensor which measures distance, that is, a laser distance meter 108. Moreover, in coordinates in the vertical direction with respect to an image, a value based on a value $h_i$ measured by a sensor which measures distance is used. In the present embodiment, $h_i$ is used as is. In step S606, the marker central calculation unit 112 associates the position $q_{i1}(u_{i1}, v_{i1})$ calculated in step S605 and the height $h_1$ measured with the laser distance measure 108 to the coordinate value $p_{i1}(x_{i1}, y_{i1}, z_1)$ of the robot coordinate system of the work reference point 105 at that time. In other words, the combination of $p_{i1}(x_{i1}, y_{i1}, z_1)$ and $r_{i1}(u_{i1}, v_{i1}, h_1)$ is stored in the coordinate value storage unit 117. By step S607, the processes in steps S602 through S606 mentioned above are repeated for n calibration points.

In the above manner, a calibration unit 113 moves a robot arm to n points $p_{11}(x_{11}, y_{11}, z_1), \ldots, p_{n1}(x_{n1}, y_{n1}, z_1)$ arranged in a lattice shape at predetermined positions on a first plane 102 at a first height $z_1$, and does the work mentioned above at each point. Next, the same work is done at points $p_{12}(x_{12}, y_{12}, z_2), \ldots, p_{n2}(x_{n2}, y_{n2}, z_2)$ on a second plane 104 at a second height $z_2$ (steps S608 through S614). By this, a transform $g_i: R_i \to P$ and inverse transform $g^{-1}_i: R_i \to P_i$ between an image coordinate system and robot coordinate system for 2n discrete points are acquired. The sets of points on which calibration was executed on each set coordinates are referred to as $\{P_i\}$, $\{Q_i\}$, and $\{R_i\}$.

Moreover, here, the number of points on which calibration is executed at a first height and the number of points on which calibration is executed at a second height are assumed to be the same; however, it is possible that the numbers of calibration points are not actually the same. Similarly, the xy-coordinates of Pi1 and Pi2 do not have to match as $(x_{i1}, y_{i1})=(x_{i2}, y_{i2})$ between each pair of points at the first height and second height. However, in the following explanation, for the purpose of simplicity, n points are arranged in a lattice shape on each of the first plane 102 and second plane 104 having different heights, and the xy-coordinate positions of each point match $((x_{i1}, y_{i1})=(x_{i2}, y_{i2}))$.

(Calculation of Parameters)

Next, in step S615 through S617, the calibration unit 113 obtains parameters necessary for calibration from each calibration point value obtained in steps S601 through S614 mentioned above.

Figure 7B:
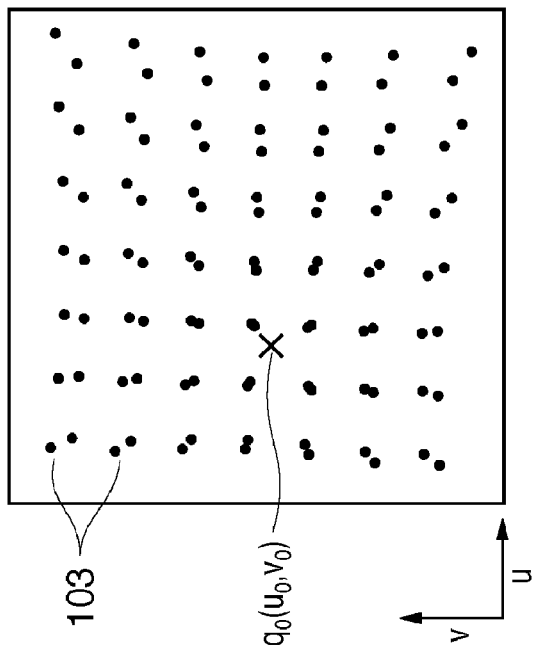
FIGS. 7A, 7B are diagrams illustrating the principle behind a calibration method according to the first embodiment.
Figure 7A:
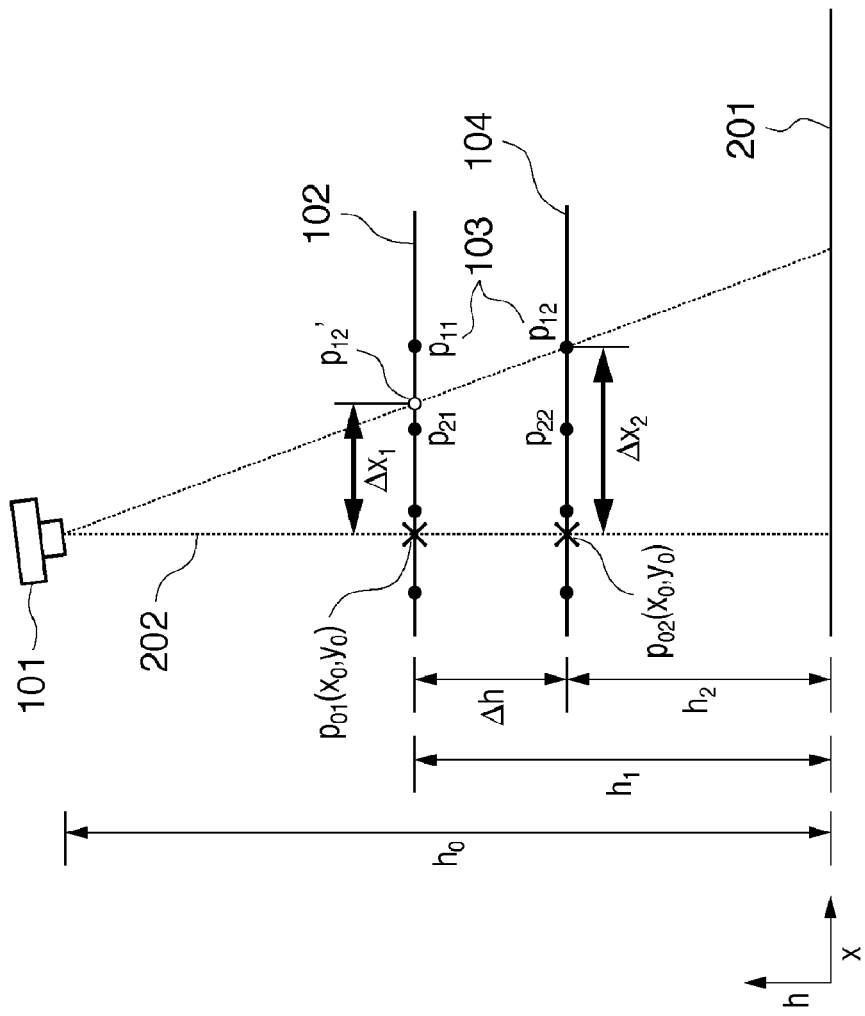

As shown in FIG. 7A, the coordinate positions on the xy-surface of points $p_{11}$ and $p_{12}$ in robot coordinates are the same, but the heights $h_1$ and $h_2$ are different. For this reason, there is a positional misalignment between the positions of $p_{11}$ and $p_{12}$ in image coordinates $q_{11}(u_{11}, v_{11})$ and $q_{12}(u_{12}, v_{12})$, as shown in FIG. 7B. Moreover, FIG. 7B is shown under the assumption that there are camera image strains and deviations in the rotational direction between camera coordinates and robot arm coordinates, and small deviations resulting from mechanical error in the robot arm. As shown in FIG. 7A, such positional deviations do not occur on a vertical line 202 cast down from a camera focal point to the xy-plane. In the calibration unit 113, the point in image coordinates through which this vertical line 202 passes is obtained and set as an origin point $q_0(u_0, v_0)$ on a uv-plane. Also, $p_0(x_0, y_0)$ corresponding to $q_0(u_0, v_0)$ on the xy-plane is set as the origin point on the xy-plane (step S615).

However, because the vertical line 202 is not generally limited to passing through one of the points $q_{i\epsilon}\{Q_i\}$ on which calibration was executed, calculation of the origin point $q_0$ is estimated using 4 points $q_{k1\epsilon}D(\{Q_i\})$ at which the absolute value of the deviation amount $\Delta q_{i1}=(q_{i2}-q_{i1})$ is a minimum. Here, $D(\{Q_i\})$ shows the 4 points on the upper level for which the absolute value of $\Delta q$ is the smallest in the set of points $\{Q_i\}$ on which calibration was executed, that is, the 4 points that are closest to the origin point $q_0$. Linear interpolation is executed using the deviation amounts $\Delta q_{k1}$, and a point $q_0(u_0, v_0)$ at which the deviation is 0 is estimated with sub-pixel accuracy.

Here, as shown in FIG. 7, $p_{12}'(x_{12}', y_{12}', z_1)$ is assumed to be seen at the same position as $p_{12}(x_{12}, y_{12}, z_2)$ in image coordinates. The height between the camera and stage floor is $h_0$. Also, the height between the stage floor and the first plane 102 is $h_1$, and the height between the stage floor and the second plane 104 is $h_2$, and $\Delta x_1=x_{12}'-x_0$, $\Delta x_2=x_{12}-x_0$, $\Delta y_1=y_{12}'-y_0$, $\Delta y_2=y_{12}-y_0$. In this case, from similar relationships, there is the simple relationship shown below, and the height $h_0$ can be obtained from this.

$$h_0 = \frac{h_1 \Delta x_2 - h_2 \Delta x_1}{\Delta x_2 - \Delta x_1} = \frac{h_1 \Delta y_2 - h_2 \Delta y_1}{\Delta y_2 - \Delta y_1} \quad \text{[Formula 1]}$$

Figures 8A, 8B:
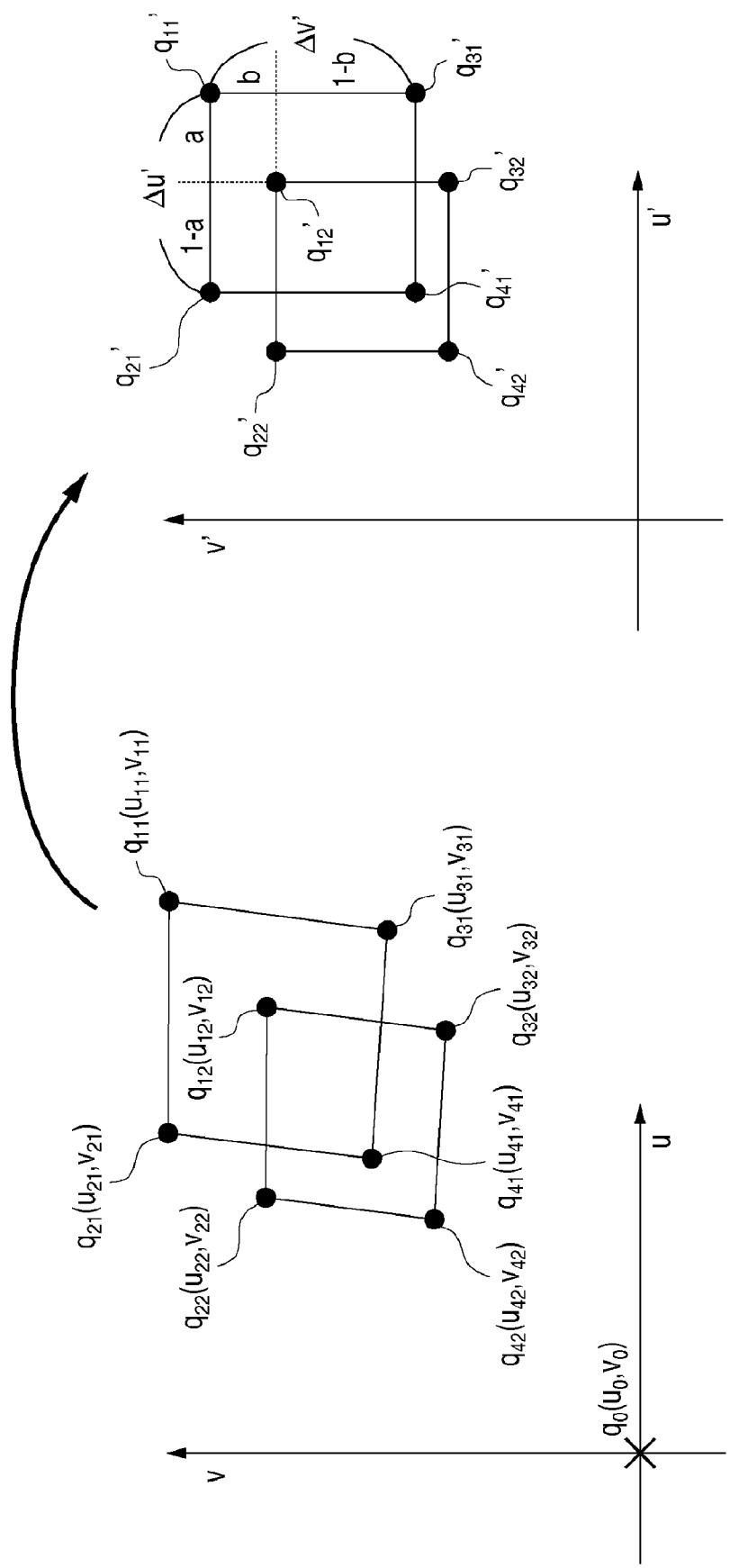
FIGS. 8A, 8B is a diagram explaining a method for interpolating a position of an arbitrary point using calibrated points in the vicinity.

Here, to obtain the unknown values $x_{12}'$ and $y_{12}'$, first, as shown in FIG. 8, a projection transform is done on points $\{q_{11}, q_{21}, q_{31}, q_{41}\}$ surrounding $q_{12}$ in image coordinates (u,v) to obtain the square vertices $\{q_{11}', q_{21}', q_{21}', q_{31}', q_{41}'\}$. $q_{12}$ is projected to $q_{12}'$ using the same transform. Parameters a, b ($0 \leq a \leq 1, 0 \leq b \leq 1$) at which $p_{12}'$ as an internal division point of the square $\{q_{11}', q_{21}', q_{31}', q_{41}'\}$ internally divides $\Delta u'$ and $\Delta v'$ are obtained. $P_{12}'(x_{12}', y_{12}', z_1)$ as an internal division point of $\{p_{11}, p_{21}, p_{31}, p_{41}\}$ corresponding to $\{q_{11}', q_{21}', q_{31}', q_{41}'\}$ is obtained using parameters a and b. In other words, $p_{12}$ is determined such that the relative positional relationship between $q_{12}$ and surrounding points $\{q_{11}, q_{21}, q_{31}, q_{41}\}$ is the same as the relative positional relationship between $p_{12}'$ and $\{p_{11}, p_{21}, p_{31}, p_{41}\}$.

(Coordinate Transform)

Here, a coordinate $r_i(u_i, v_i, h)$ in which an arbitrary height h is added to a calibrated point $q_i(u_i, v_i)$ will be taught. Using a similar relationship, a transform $f_i:R_i \rightarrow P$ projecting image coordinates $r_i$ onto robot coordinates can be expressed using the formulae below. In other words, the calibration unit 113 acquires a transform function $f_i:R_i \rightarrow P$ for image coordinates and robot coordinates about a discrete point i using $q_0$, $p_0$ and a group of 2n coordinates (step S616).

$$x = f_x^i(u_i, v_i, h) = \frac{h_0 - h}{h_0 - h_i} x_i, \quad \text{[Formula 2]}$$

$$y = f_y^i(u_i, v_i, h) = \frac{h_0 - h}{h_0 - h_i} y_i,$$

$$z = f_z(h) = (h - h_i)\frac{\Delta z}{\Delta h} + z_i$$

Note that, $\Delta z = z_2 - z_1$, and $\Delta h = h_2 - h_1$. Also, $x_i$ and $y_i$ in the formulae are obtained using a transform function $g_i:R_i \rightarrow P_i$ between the image coordinate system and robot coordinate system shown in the formulae below.

$$x_i = g_x^i(u_i, v_i, h_i),$$

$$y_i = g_y^i(u_i, v_i, h_i). \quad \text{[Formula 3]}$$

To transform positions not included in points on which calibration was executed $\{Q_i\}$, interpolation is done using a projection transform method, etc., using values of a plurality of neighboring points on which calibration was executed, similarly to the method shown in FIG. 8. In this manner, a transform means $f:R \rightarrow P$ for transforming an arbitrary point $r(u, v, h)$ to $p(x, y, z)$ is acquired. In other words, the calibration unit 113 interpolates a discrete point i to acquire a continuous transform function from image coordinates to robot coordinates $f:R(u, v, h) \rightarrow P(x, y, z)$ (step S617). An inverse transform $f^{-1}:P \rightarrow R$ can also similarly be realized by utilizing similarity relationships and interpolation values of neighboring points on which calibration was executed. The transform function f acquired in the above manner is stored in a coordinate value storage unit 117.

After executing calibration by the above method, the calibration jig 107 is removed and calibration is ended. Moreover, once calibration is completed, calibration may thereafter be executed only when necessary, such as when positional deviation occurs due to aging or a physical shock, etc. Also, when there are no working problems with the robot arm, work can be done on a work subject without removing the calibration jig 107.

(Operation of the Apparatus after Completion of Calibration)

Next, operation of the apparatus when actually working on a work subject on a stage will be explained. Hereafter, it is assumed that a work subject has a three-dimensional shape, and when working, a height $h_k$ of a work subject reference point 111 of a work subject that is used as a reference is known in advance through measurement with a laser distance meter 108, etc.

A robot controller 120 first captures a work subject 110 on a stage 201 using a camera 101, and detects a position $q_k(u_k, u_k)$ of a work reference point on an image. The robot controller 120 obtains coordinates of a reference point $r_k(u_k, v_k, h_k)$ using a known height $h_k$ of a work subject reference point 111. Next, a coordinate transform unit 121 calls a transform function f for coordinate transform stored in a coordinate value storage unit 117 and transforms $r_k$, and obtains a position of a work reference point $p_k(u_k, y_k, z_k)$ in robot coordinates. A work reference point 105 of a robot arm is moved to a position $p_{k+w}(x_k+x_w, y_k+y_w, z_k+z_w)$ separated from an obtained work reference point by a predetermined distance $(x_w, y_w, z_w)$, and predetermined work is done with a predetermined orientation.

In the above manner, because a calibration jig 107 according to the first embodiment is equipped with markers 109 distributed in a radial pattern extending from the center of a work reference point, it is possible to estimate the position of a work reference point from an image even in a case when a large portion of the calibration jig is obscured. Also, while flat plate calibration jigs (markers) have a disadvantage that the indicators can be difficult to observe depending on the angle of observation, because the markers of the above embodiment have a three-dimensional shape, it is possible to stably observe the markers from any angle. Also, in the case of using a plurality of cameras, such a three-dimensional and radial arrangement of markers allows simultaneous observation of calibration reference points from a variety of angles.

Further, in capturing by a camera 101 from above, cases in which a robot arm blocks the view and a calibration reference point cannot be directly observed are frequent. However, by using the above embodiment, if a partial shape of a plurality of markers is contained in the observed image data, image coordinates of the center point of the markers can be estimated by a marker central point calculation unit 112.

Further, if calibration jigs 107 having line segments arranged in a radial pattern such as those in FIG. 1 and FIGS. 3A and 3B are used in the vicinity of predetermined positions such as a robot arm tip, etc., marker line segments can be detected using low-calculation-cost image processing methods such as Hough transform, etc. In this case, even when a work reference point is obscured, if 2 or more marker line segments can be detected, then the reference point can be detected by obtaining their vanishing point. Further, when 3 or more lines are used, precision of detection can be increased by obtaining the vanishing point using a least squares method, etc. Thus, forms in which a reference point (center point of markers) cannot be seen such as those in FIGS. 3A through 3D or those in which the center point of markers is empty space such as those in FIGS. 10A through 10C may be used.

Also, various radial forms such as those shown in FIGS. 3A through 3H may also be used as a form of a calibration jig 107. In particular, when a cone shape such as those shown in FIGS. 3A through 3C is used, interference with other objects when fixing it to a robot arm and operating can be reduced. Also, in this case, by using a transparent material for the calibration jig, blocking caused by the calibration jig itself can be avoided.

Second Embodiment

Next, as a second embodiment, a calibration method that does not use a laser distance meter 108 will be described. In this method, calibration of multiple degrees of freedom (DOF) robot arms other than XYZ orthogonal robot arms such as scalar or multiple perpendicular-joint robot arms is possible. In the second embodiment, a robot arm, the same calibration jig as that used in the first embodiment, and two or more cameras are used. By using a three-dimensional form for the markers, the markers can be stably observed from any angle, and a calibration reference point can be simultaneously observed from various angles. In the second embodiment, calibration reference points are observed by a plurality of cameras using these marker characteristics. Moreover, the composition of the second embodiment is mostly the same as that of the first embodiment (FIG. 1), and has a form in which a plurality of cameras 101 is connected.

Regarding the plurality of cameras 101, each camera parameter is obtained. Calculation of camera parameters can be executed using a general method such as by measuring a calibration object with a known form. Here, distortion of field is removed by executing geometric correction.

A reference point is measured by a plurality of cameras 101 using the same calibration jig 107 as that of the first embodiment. Then, the position of the detected reference point of the calibration jig 107 is transformed to epipolar lines in world coordinates in each image. Then, by obtaining the intersection point $s_1(x_1, y_1, z_1)$ of the plurality of epipolar lines acquired from images of the plurality of cameras, the three-dimensional position in world coordinates of a calibration reference point, that is, three-dimensional coordinates, can be calculated.

In the same manner as in the first embodiment, a robot arm is moved to a predetermined position $\{P_i\}=\{p_1(x_1, y_1, z_1), \ldots, p_m(x_m, y_m, z_m)\}$ at which calibration is executed, and $\{S_i\}=\{s_1(x_1, y_1, z_1), \ldots, s_m(x_m, y_m, z_m)\}$ corresponding to each position is acquired. The points at which to execute calibration $\{P_i\}=\{p_1, \ldots, p_m\}$ are in a three-dimensional lattice pattern. By this, a transform $f_i:S_i \to P_i$ and inverse transform $f_i^{-1}:P_i \to S_i$ between a world coordinate system and robot coordinate system for m discrete points in a three-dimensional lattice pattern are acquired.

In order to acquire corresponding robot coordinates $p_j$ from an image of an arbitrary object J captured by a plurality of cameras, the correspondence relationship between the calibration points arranged in a lattice pattern mentioned above is obtained through linear interpolation. First, intersections of epipolar lines are calculated from a number n equal to the number of cameras of values $\{q_j^1(u_j^1, v_j^1), \ldots, q_j^n(u_j^n, v_j^n)\}$ in image coordinates, and world coordinates $s_j(x_j, y_j, z_j)$ are obtained. Next, a plurality of points $s_k(x_k, y_k, z_k) \in D(s_j)$ neighboring $s_j(x_j, y_j, z_j)$ in world coordinates are obtained. However, $s_e D(s_j)$ shows 8 vertex points $\{s_k(x_k, y_k, z_k)\}$ neighboring $s_j(x_j, y_j, z_j)$ of the set of points on which calibration was executed $\{S_i\}$. Each of the 8 points in robot coordinates $\{p_k(x_k, y_k, z_k)\}$ is acquired using a transform $f_i:S_i \to P_i$.

A multiple DOF robot arm is different from an XYZ orthogonal robot arm in that it is difficult to predict with what characteristics robot arm and world coordinate positional deviations will occur. However, if the three-dimensionally lattice points $\{P_i\}$ on which calibration is to be executed are sufficiently dense, the vertices $\{s_k(x_k, y_k, z_k)\}$ can be transformed to a cube by scaling, rotation, skewing, and translation. $s_k$ is affine transformed and vertices of a cube $s_k'(x_k', y_k', z_k')=A(s_k(x_k, y_k, z_k))$ are acquired. $s_k$ is similarly transformed and $s_j'=A(s_j)$ is acquired. However, A is a function expressing three-dimensional affine transform.

Next, internally dividing point parameters a, b, and c ($0 \leq a \leq 1, 0 \leq b \leq 1, 0 \leq c \leq 1$) of internally dividing points $s_j'$ of a cube to be mapped $\{s_k'\}$ are calculated. $p_j(x_j, y_j, z_j)$ as points internally dividing vertices $\{p_k\}$ of a cube in robot coordinates are obtained using internally dividing point parameters a, b and c. In other words, $p_j$ is determined such that the relative positional relationship between $s_j'$ and points in the vicinity $\{s_k'\}$ is the same as the relative positional relationship between $p_j$ and $\{p_k\}$. This value $p_j$ is the position of an object J in robot coordinates. In this manner, calibration between arbitrary world coordinates and robot coordinates becomes possible.

In the above manner, the second embodiment obviates the need to attach a laser distance meter 108 to measure the height position of a reference point. Thus, the number of parts attached to the robot arm can be reduced.

Third Embodiment

Next, as a third embodiment, and as derivative methods of the calibration processing explained in the second embodiment, methods which do not utilize calibration jigs such as those shown in FIGS. 3A through 3H or FIGS. 9A through 9C during calibration work will be given. In the present embodiment, first, 4 markers are distributed at predetermined positions on the robot arm. Next, in the same manner as in the second embodiment, a calibration jig is fixed and measured with a camera, and a calibration reference point and 4 markers are detected. These are transformed to world coordinates, and the positions in world coordinates of the reference point and 4 markers are acquired. Next, the relative positional relationships in world coordinates of the 4 markers and calibration reference point are stored. Next, the calibration jig is removed, and thereafter the position of the calibration reference point in world coordinates is determined from the relative positional relationships of the 4 markers.

Processes thereafter are the same as in the second embodiment. Moreover, in order for these methods to function properly, the following three conditions must be satisfied:
(1) the positions of the 4 markers mentioned here must always be visible by the camera during work
(2) the relative positions of the calibration reference points and markers must not change due to deformation, twisting, etc.
(3) the 4 markers must not be on the same plane.

Fourth Embodiment

Figure 9C:
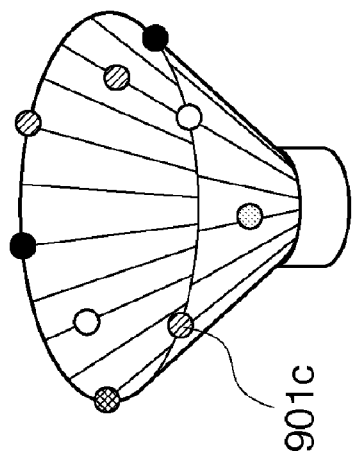
FIGS. 9A-9C are diagrams illustrating examples of calibration jigs with attached markers for determining the position and orientation of the calibration jigs.

In the fourth embodiment, a method to simultaneously execute calibration not only of the position but also the orientation of a robot arm will be discussed. Moreover, the apparatus composition and calibration work of the present embodiment is basically the same as that of the second embodiment. A case in which calibration is executed using a conical calibration jig with a base surface part to which perimeter part markers 901a, as shown in FIG. 9A, for orientation detection are attached to the perimeter will be explained below.

In the present embodiment, in addition to the work executed in the second embodiment, perimeter part markers 901a distributed around the circumference of a base surface part of a calibration jig 107 are detected. Moreover, as the perimeter part markers 901a have a circular shape, a calibration unit 113 can easily distinguish between a marker with a line segment shape 109a and a perimeter part marker 901a. Also, the color and shape of perimeter part markers 901a should be chosen such that they can be distinguished from line segment shape markers 109a. Then, using a method such as general Hough transform, an ellipsoid is fitted to the plurality of detected perimeter part markers 901a. Next, the center point of the obtained ellipsoid is obtained. Then, a direction in which a virtual vertex of a cone of a calibration jig 107 can be obtained by obtaining an axis connecting this center point and a reference point (center point of markers). Moreover, the shape of a base surface part is not restricted to a circle, and a brachymorphic or other shape may be applied. Moreover, algorithms for such a process are well known, and a detailed explanation will be omitted.

Figure 9B:
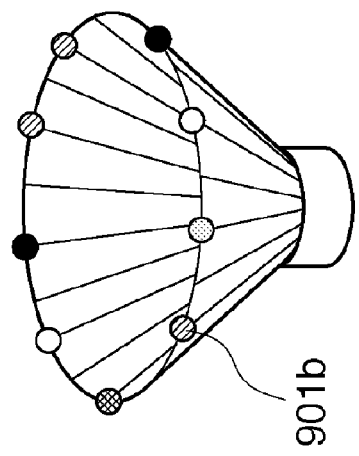
Figure 9A:
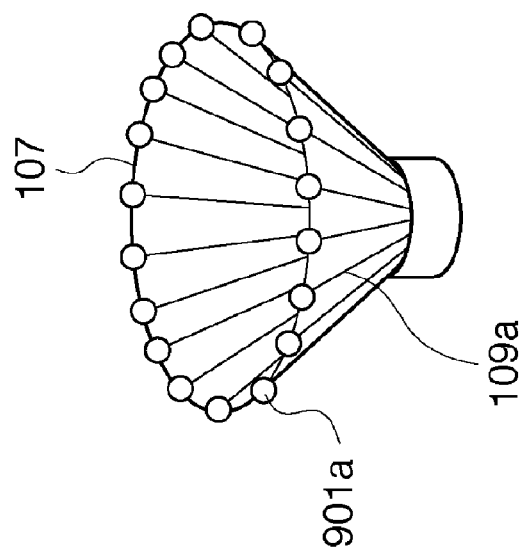

Also, at this time, as shown in FIG. 9B, color can be applied, etc., to each marker 901b to distinguish between individual markers. By doing this, the orientation of the jig can be obtained by referring to relative positional relationships between markers stored in advance in a storage unit without executing detection on an ellipsoid by image processing. Further, as shown in FIG. 9C, a calibration jig with markers 901c having differences not only in color, but also in predetermined position may also be used. In this case, the same effect as FIG. 9B can also be attained, that is, it is possible to obviate the need to detect an ellipsoid. Detection processing of the orientation of a calibration jig in this case is also well known, and a detailed explanation will be omitted.

In the above manner, in the fourth embodiment, the position and orientation of a robot arm is obtained by:
  obtaining the center of a base surface of a calibration jig and obtaining a center axis, or
  additively setting markers which can be distinguished from each other, and detecting their positions.

In this manner, although the calibration methods in the first through third embodiments could only detect the positions of a calibration reference point, according to the fourth embodiment, a position and orientation of a robot arm can be detected by using a calibration jig that has directionality such as a cone, and calibration can be executed.

Fifth Embodiment

As a fifth embodiment, a method of attaching a calibration jig of the present invention to the surface of a work subject and detecting a reference position of the work subject will be given. First, a work reference point 105 of a calibration jig 107 such as those shown in FIGS. 3A through 3H is matched with a work subject reference point 111 of a work subject 110. In other words, a calibration jig with a plurality of markers radially arranged from a center point of markers is externally fixed to a work subject 110 such that a work subject reference point 111 of a work subject 110 matches a center point of markers. Then, a calibration jig 107 is measured by a plurality of cameras, and a position of a work subject reference point 111 is detected in an image using the same method as in the second embodiment.

Figure 10A:
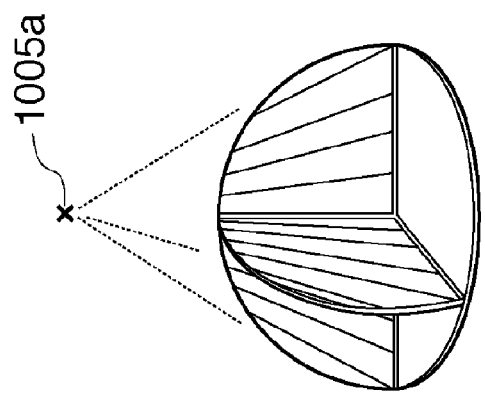
FIGS. 10A-10C are diagrams illustrating examples of embodiments of calibration jigs that determine the position of a reference position on a work subject.
Figure 10B:
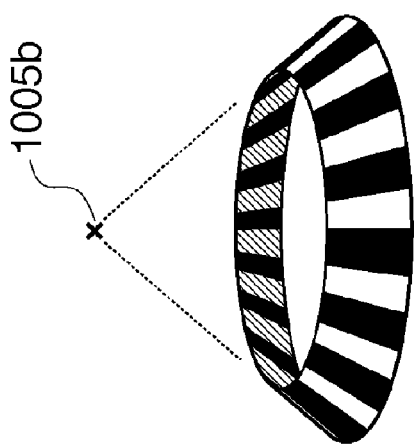
Figure 10C:
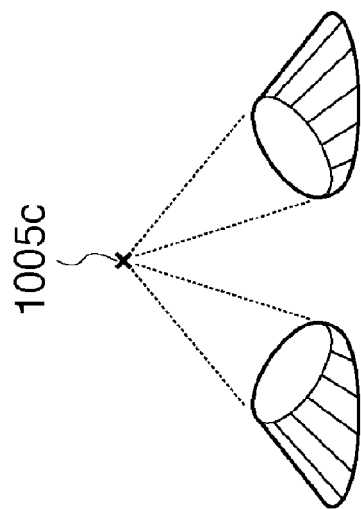

Further, by using a calibration jig with a form such as those shown in FIGS. 10A through 10C, a work subject reference point 111 of a work subject 110 can be shown as a single point (1005a, 1005b, 1005c) in space separated from a calibration jig. Further, in this case, by combining a plurality of calibration jigs as in FIG. 10C, observation by a plurality of cameras becomes easy, and effects such as an increased precision in detection of a reference position can be attained.

In the above manner, a calibration jig 107 used by the present application is not limited to a calibration jig of a working unit 106, but the position of a reference point of a work subject (work subject reference point 111) can also be detected from an image and used.

Sixth Embodiment

Figure 11:
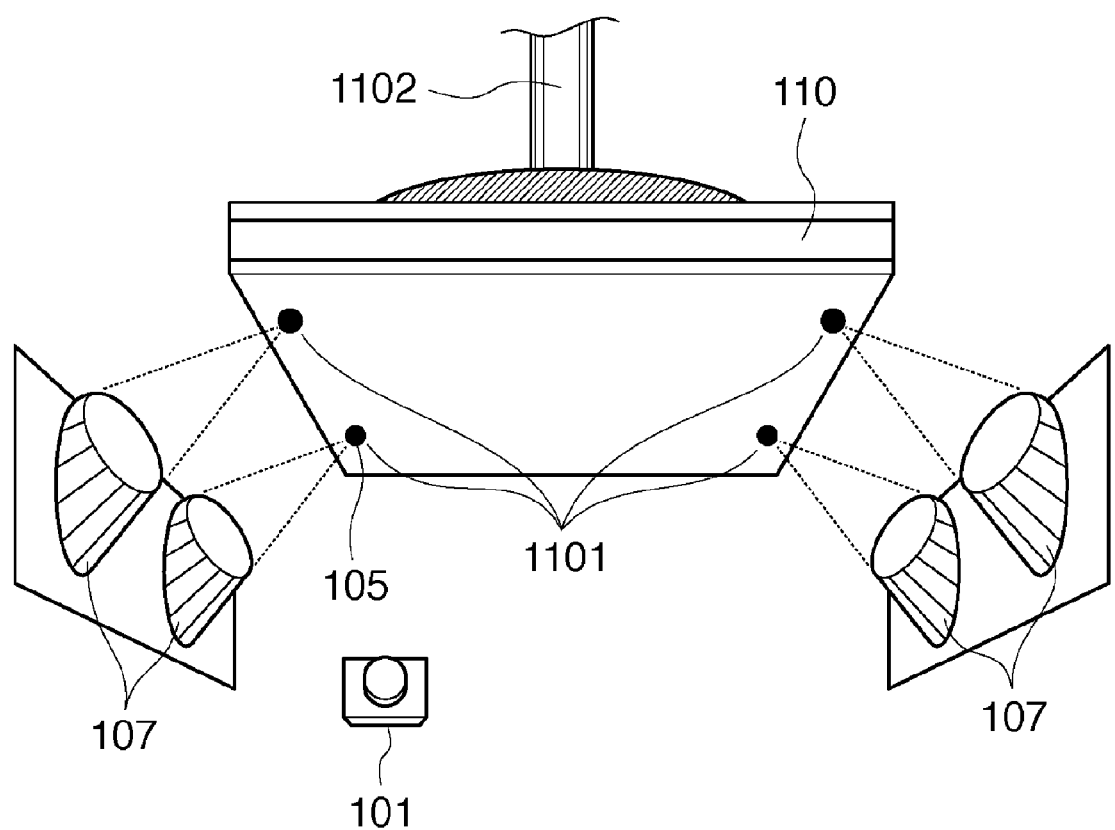
FIG. 11 is a diagram illustrating an embodiment that determines the position of a work subject using a calibration jig.

In the sixth embodiment, a method to determine whether a position determination of a work subject reference point 111 using a calibration jig explained in the above embodiment is normal or abnormal will be given. In FIG. 11, an embodiment which determines a position of a work subject 110 which is conveyed by a crane-shaped work delivery apparatus 1102 to a predetermined position in space is shown. A plurality of position determination markers 1101 is attached to predetermined locations on the work subject 110. Also, a plurality of calibration jigs 107 is pre-installed around a stage 201 which executes position determination. Here, a calibration jig 107 is installed to a position such that center points of markers of each calibration jig 107 match up with each position determination marker 1101 only when a work is placed in a correct position and orientation. The calibration jigs 107 and position determination markers are observed by a camera 101, and depending on whether or not center points of markers of the calibration jigs 107 and image determination markers 1101 all match up in an image, determination of whether or not a position determination of a work subject 110 has been executed correctly is executed.

In other words, in the sixth embodiment, calibration jigs 107 on which a plurality of markers are arranged three-dimensionally and in a radial pattern from a center point of markers are fixed externally to a work subject 110. Here, the calibration jigs 107 are distributed such that the positions of the position determination markers 1101 distributed on a work subject 110 match the positions of the center point markers when a work subject 110 is moved to a predetermined position. Further, the calibration jigs 107 as calibration jigs do not exist in the space where center points of markers exist, there is no interference between a work subject 110 and a calibration jig 107.

In the conventional determination method for the position determination of a work subject 110, a marker shape in an image or relative positional relationships between marks is stored when a work subject 110 is positioned correctly. Then, depending on whether or not captured markers match stored markers, whether or not the positional determination is correct or incorrect is determined. However, this method is not suitable for large work subjects for which all markers cannot be observed without executing zoom or camera pan. On the other hand, in the sixth embodiment, by observing each individual calibration jig 107 and group of markers 1101 using zoom and pan, it is possible to determine whether a positional determination is normal or abnormal.

Further, while most three-dimensional calibration jigs used by conventional methods have a form in which a three-dimensional calibration jig is attached to a work, there is no necessity to attach a three-dimensional calibration jig to a work in the present embodiment. Therefore, there is no necessity to prepare three-dimensional calibration jigs in a number equal to the number of works. Also, because there are no protruding objects distributed on a work (three-dimensional calibration jigs are not distributed), there is an effect of not hampering work or conveyance.

In the above manner, a calibration jig of the present invention is not limited to a calibration jig of a working unit 106, and can be used with a purpose of position matching when moving a work subject to a predetermined position.

As explained above, according to each embodiment described above, a calibration jig is equipped with a plurality of three-dimensional markers distributed in a radial pattern. For this reason, even when a part of a calibration jig (marker group) is obscured from view of a camera during measurement, calibration of the position of a robot arm can be executed by obtaining a center of markers arranged in a radial pattern by using Hough transform, etc. Also, calibration of the position of a robot arm can be executed through observation by a single camera or a plurality of cameras from a variety of angles. Also, because it is difficult for a circular cone shape equipped with markers in a radial pattern to interfere with a floor or a robot arm, etc., the degrees of freedom of orientation of a robot arm during calibration work is larger in comparison with conventional plate-shaped jigs. In some cases, it is possible to operate a robot with a calibration jig attached to the robot. A jig according to the embodiments above can use a point in space where nothing exists as a reference point for calibration or position matching.

In particular, recently, manufacturing processes have been increasingly automated in manufacturing sites, and chances to use robot arms controlled by image capturing apparatuses such as cameras are increasing. The machine control apparatus of the present application has an effect of use of increasing work precision for manufacturing processes.

Moreover, the present invention can also be achieved by directly or remotely supplying a program of software that implements the functions of the aforementioned embodiments to a system or apparatus, and reading out and executing the supplied program code by a computer of that system or apparatus. In this case, the form of the program is not particularly limited as long as it has the program function.

Therefore, the program code itself installed in a computer to implement the functional processing of the present invention using the computer implements the present invention. That is, the present invention includes the computer program itself for implementing the functional processing of the present invention.

In this case, the form of program is not particularly limited, and an object code, a program to be executed by an interpreter, script data to be supplied to an OS, and the like may be used as long as they have the program function.

As a recording medium for supplying the program, various media can be used: for example, a Floppy® disk, hard disk, optical disk, magneto-optical disk, MO, CD-ROM, CD-R, CD-RW, magnetic tape, nonvolatile memory card, ROM, DVD (DVD-ROM, DVD-R), and the like.

As another program supply method, a program can be supplied by establishing a connection to a home page on the Internet using a browser of a client computer, and downloading the program from the home page to a recording medium such as a hard disk or the like. In this case, the program to be downloaded may be either the computer program itself of the present invention or a compressed file including an automatic installation function. Furthermore, the program code that configures the program of the present invention may be segmented into a plurality of files, which may be downloaded from different home pages. That is, the claims of the preset invention include a WWW server which makes a plurality of users download a program file required to implement the functional processing of the present invention by a computer.

Also, a storage medium such as a CD-ROM or the like, which stores the encrypted program of the present invention, may be delivered to the user. In this case, the user who has cleared a predetermined condition may be allowed to download key information that decrypts the encrypted program from a home page via the Internet, so as to install the encrypted program in a computer in an executable form using that key information.

The functions of the aforementioned embodiments may be implemented by a mode other than that by executing the readout program code by the computer. For example, an OS or the like running on the computer may execute some or all of actual processes on the basis of an instruction of that program, thereby implementing the functions of the aforementioned embodiments.

Furthermore, the program read out from the recording medium may be written in a memory equipped on a function expansion board or a function expansion unit, which is inserted into or connected to the computer. In this case, after the program is written in the memory, a CPU or the like equipped on the function expansion board or unit executes some or all of actual processes based on the instruction of that program, thereby implementing the functions of the aforementioned embodiments.

According to the present invention, it is possible to execute calibration of a working unit position even when a portion containing a marker center part is obscured during image measurement.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-014177, filed Jan. 24, 2008, which is hereby incorporated by reference herein in its entirety.

What is claimed is:

1. A working apparatus comprising:
a working unit which executes work on a work subject; and
a calibration jig on which are arranged a plurality of markers in a radial pattern from a center point of markers,
wherein the plurality of markers are arranged in three dimensions, and
wherein the calibration jig is attached to the working unit such that a reference point placed on the working unit for calibration coincides with the center point of the markers.

2. The apparatus according to claim 1, further comprising:
an imaging unit which captures the working unit;
a calculation unit which calculates coordinates in an image of a center point of the markers based on a marker image existing in an image captured by the imaging unit; and
a calibration unit which calibrates transform processing between image coordinates and apparatus coordinates based on coordinates of the center point of the markers calculated by the calculation unit and apparatus coordinates of the reference point of the working unit.

3. The apparatus according to claim 1, wherein the calibration jig has a cone shape portion with the center point of markers as a vertex, the plurality of markers being arranged on a side surface of the cone shape portion.

4. The apparatus according to claim 1, wherein a portion on which the plurality of markers is arranged on the calibration jig is comprised of a material which transmits light.

5. The apparatus according to claim 1, further comprising:
a plurality of imaging units which capture the working unit;
a calculation unit which calculates coordinates in an image of the center point of markers based on an image of markers from each of a plurality of images captured by the plurality of imaging units;
an acquisition unit which acquires a plurality of epipolar lines corresponding to the center point of markers from the plurality of images, and acquires 3-dimensional coordinates of the center point of markers based on an intersection point of the plurality of epipolar lines; and
a calibration unit which calibrates transform processing between 3-dimensional coordinates acquired from the plurality of images and apparatus coordinates based on 3-dimensional coordinates of the center point of markers acquired by the acquisition unit, and on apparatus coordinates of the reference point of the working unit.

6. The apparatus according to claim 2, wherein each of the plurality of markers has a line segment shape with the center point of markers as a center, and the calculation unit calculates an intersection point of the markers having a line segment shape as the center point of markers.

7. The apparatus according to claim 2, wherein the calculation unit acquires, from values measured by a sensor which executes distance measurement, coordinates of the center point of markers in the vertical direction corresponding to the image.

8. The apparatus according to claim 2, wherein the calibration jig comprises a cone shape portion having the center point of markers as a vertex, and the plurality of markers being arranged on a side surface of the cone shape portion, and a plurality of perimeter portion markers being arranged for the purpose of detection of a base surface portion of the cone shape portion, and
the apparatus further comprises an orientation detection unit which detects a base surface portion from the perimeter portion markers, and detects an orientation of the calibration jig based on an extension direction from a center of a detected base surface portion to the center point of markers calculated by the calculation unit.

9. The apparatus according to claim 2, wherein the calibration jig comprises a plurality of markers having different colors or shapes from each other, and the apparatus further comprises an orientation detection unit which detects a position or an orientation of the calibration jig from a positional relationship of the plurality of markers having different colors or shapes from each other.

10. A working apparatus, comprising:
a working unit which executes work on a work subject; and
a calibration jig on which is arranged a plurality of markers in a radial pattern from a center point of markers,
wherein the plurality of markers are arranged in three dimensions, and
wherein the calibration jig is fixed externally to the work subject such that a reference point of the work subject coincides with the center point of markers.

11. A working apparatus, comprising:
a working unit which executes work on a work subject, and
a calibration jig on which is arranged a plurality of markers in a radial pattern from a center point of markers,
wherein the plurality of markers are arranged in three dimensions,
wherein a position in which the center point of markers exists is a space in which a calibration jig does not exist, and
wherein the calibration jig is externally fixed to the work subject such that, when the work subject is moved to a predetermined position, a position of a marker arranged on the work subject coincides with a position of the center point of markers.

* * * * *